United States Patent [19]
Devon et al.

[11] Patent Number: 5,243,626
[45] Date of Patent: Sep. 7, 1993

[54] METHOD FOR CLOCKS SYNCHRONIZATION FOR RECEIVING PULSE POSITION ENCODED SIGNALS

[75] Inventors: Mark Devon, San Jose; Joseph W. Hingston, Campbell, both of Calif.

[73] Assignee: Apple Computer, Inc., Cupertino, Calif.

[21] Appl. No.: 751,487

[22] Filed: Aug. 29, 1991

[51] Int. Cl.$^5$ .............................................. H03K 7/04
[52] U.S. Cl. ..................................... 375/23; 375/106
[58] Field of Search .................... 375/23, 76, 102, 106; 455/608, 619; 329/107; 370/10; 328/109; 307/234

[56] References Cited
U.S. PATENT DOCUMENTS

| | | | |
|---|---|---|---|
| 3,370,126 | 2/1968 | Scidmore | 375/23 |
| 4,648,133 | 3/1987 | Vilnrotter | 375/23 |
| 4,866,738 | 9/1989 | Wiesmann et al. | 455/608 |
| 5,023,888 | 6/1991 | Bayston | 375/23 |
| 5,031,196 | 7/1991 | Bahlmann et al. | 455/619 |

Primary Examiner—Stephen Chin
Attorney, Agent, or Firm—Mark Aaker

[57] ABSTRACT

A method for clock synchronization for receiving pulse position encoded signals in which a clock signal defines slots or windows of time in which to receive pulse signals. The signal received within a slot is measured to obtain a value representing the amount of signal received within that slot. The values from adjacent slots are compared to determine into which slot the signal most fully fits, and to determine a clock correction value which would change the phase of the clock to make the slots more accurately center on the received pulses. During a time period in which clock adjustment will not affect received pulses, the clock correction value is applied to the clock. In a preferred form, the measurement of pulses, comparison between slots, and clock correction are all performed digitally. A list of energy values is maintained for all slots within a frame, so that the maximum energy value can be selected for assigning a pulse position to a slot within that frame.

10 Claims, 2 Drawing Sheets

E(2) IS THE ENERGY CONTAINED IN SLOT 2
E(3) IS THE ENERGY CONTAINED IN SLOT 3

METHOD FOR CLOCKS SYNCHRONIZATION FOR RECEIVING PULSE POSITION ENCODED SIGNALS

BACKGROUND OF THE INVENTION

This invention relates to a method for synchronizing the clock signal in a digital data receiver to decode pulse position encoded signals.

In pulse position modulation (PPM) the time position of pulses carries the message to be communicated. The positioning of pulses is referenced to a clock signal which defines slot times in which signals are expected to appear. For example, at a clock frequency of 14.7 MHz and using ten clock signals to define a slot, each slot time is 680 nanoseconds long. For a 32-slot PPM frame, a pulse appearing in the first slot would represent the number 0, a pulse appearing in the second slot would represent the number 1, and so on, counting upward to the last slot which would be the number 32, or in hexadecimal representation #1 F. Thus, we can see that five binary bits are encoded and transmitted in a 32-slot PPM frame.

When receiving a PPM signal, it is necessary to decide in which slot an arriving pulse belongs, usually in "real time" as the pulses are received. If a pulse is incorrectly assigned to the wrong slot, due to variations in the time position of the pulse or the slot, the digital signal is incorrectly decoded. It is desirable to have a method for correctly assigning pulses to slots, and for correcting variations in the time positions of the slots by changing the phase or timing of the clock signal.

SUMMARY OF THE INVENTION

In a method for clock synchronization for pulse position encoded signals in accordance with this invention, a clock signal is generated which defines slots or windows of time in which to receive pulse signals. The pulse signal received within a slot is measured to obtain a value representing the amount of pulse signal received within that slot. The values from adjacent slots are compared to determine into which slot the pulse signal most fully fits, and to determine a clock correction value which would change the phase of the clock to more accurately center the slots on the received pulses. During a time period in which clock adjustment will not affect received pulses, the clock correction value is applied to the clock. In a preferred form, the measurement of pulses, comparison between slots, and clock correction are all performed digitally. A list of energy values is maintained for all slots within a frame, so that the maximum energy value can be selected for assigning a pulse position to that slot within the frame.

DETAILED DESCRIPTION

Figure 1:
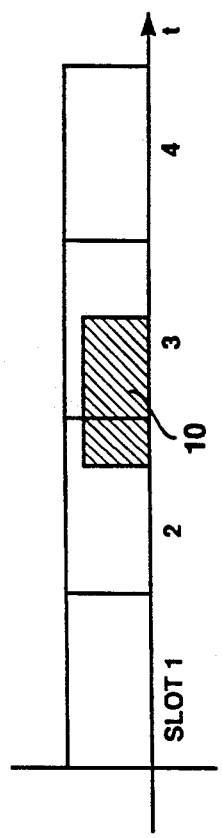
FIG. 1 shows a depiction of slot timing around a received pulse.

In a first step in accordance with this invention, a clock signal is used to define slots into which received pulses fall. FIG. 1 shows a depiction of slot timing around a received pulse. Slot 1, 2, 3 and 4 are defined as time advances to the right. A received pulse signal 10 is shown partially overlapping slot 2 and slot 3. Because the pulse is generated at a separate transmitter, the timing of the transmit clock may not match the timing of the local receiving clock, and a received pulse may fall across the boundary of more than one slot. Another factor affecting the position of the pulse may include variable time delay between the transmitter and the receiver. The receive clock is adjusted to bring it into phase or synchronization with the received pulses. If received pulses are "spread" or widened due to limited channel bandwidth, slow response times, filtering or other effects, a pulse may occupy more than a single slot, but will be primarily positioned on a single slot. Noise impulses may also appear in slots and need to be discounted in assigning the slot position of signal pulses.

Figure 2:
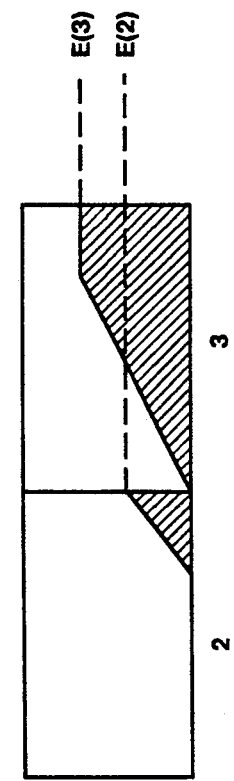
FIG. 2 shows a method of measuring the amount of pulse energy falling within each slot time.

In a next step in accordance with this invention, the pulse signal received within a slot is measured to obtain a value representing the amount of signal received within that slot. FIG. 2 shows a method of measuring the amount of pulse energy falling within each slot time. The pulse signal occurring within a slot is integrated, and at the end of the slot time, the integrated value is measured as the energy value for that slot. The integrator is then reset before integrating any pulse signal occurring in the next slot time. In FIG. 2, the pulse signal is integrated during slot 2, creating an upward ramping energy value as more signal is received. At the end of slot 2, the total energy value E(2) is measured, and the integrator is reset to zero. As pulse signal is received during slot 3, the energy value ramps upward to a final value E(3) at the end of slot 3.

In a next step in accordance with this invention, the integrated and measured values from adjacent slots are compared to determine into which slot the signal most fully fits. Referring to FIG. 2, energy value E(2) represents the pulse signal energy received during slot time 2, and energy value E(3) represents the pulse signal energy received during slot time 3. When E(3) is greater than E(2), the pulse is considered to have arrived during slot 3.

In a next step in accordance with this invention is to determine a clock correction value which would change the phase of the clock to make the slots more accurately center on the received pulses. The ratio of pulse energy arriving in a particular slot to the pulse energy in the particular and adjacent slots represents the percentage of the pulse fitting within the particular window. Referring again to FIG. 2, when $E(2)/(E(2)+E(3))$ is for example 10%., than means that 10% of the pulse is arriving in the earlier slot 2. An appropriate clock correction value may be to advance the clock by 10% of a slot time, to more fully center the pulse within slot time 3, for example 10%8 680 nanoseconds=68 nanoseconds. Where ten clock signals are used to define a slot, a 10% correction can be achieved by a clock correction value equal to one clock signal period.

Figure 3:
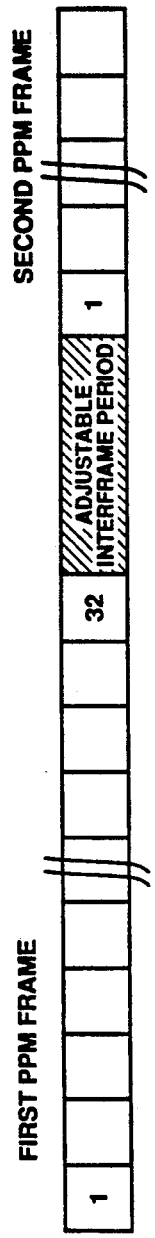
FIG. 3 shows a depiction of a series of pulse position encoded signal slots defining a frame, separated by an interframe period.

In a next step in accordance with this invention, during a time period in which clock adjustment will not affect received pulses, the clock correction value is applied to the clock signal. FIG. 3 shows a depiction of a series of pulse position encoded signal slots defining a frame, separated by an interframe period. In this depiction, a PPM signal can be received in one of 32 slot times, in a unit known as a frame, followed by an interframe period, and then followed by another frame of PPM signal. If the interframe gap is made adjustable, the clock correction factor can be applied during the interframe gap without affecting the reception of PPM signals.

In a preferred form of implementing this invention, the measurement of pulses, comparison between slots, and clock correction are all performed digitally. For example, the integrated value measuring the pulse signal, is converted by an analog-to-digital converter, so that energy values for each slot, such as E(2), E(3), ... are all in digital form. The values are stored in a list. For a 32 slot PPM frame, 32 values are stored. Then, a digital processor can compare the values to select the maximum energy value for assigning the slot position of the pulse within that frame. Also, a digital clock correction value can be calculated and applied to the clock signal either digitally or by digital-to-analog conversion. More sophisticated algorithms can be used to select the slot position which consider the effects of noise, the pulse width, and other relevant factors.

Figure 4:
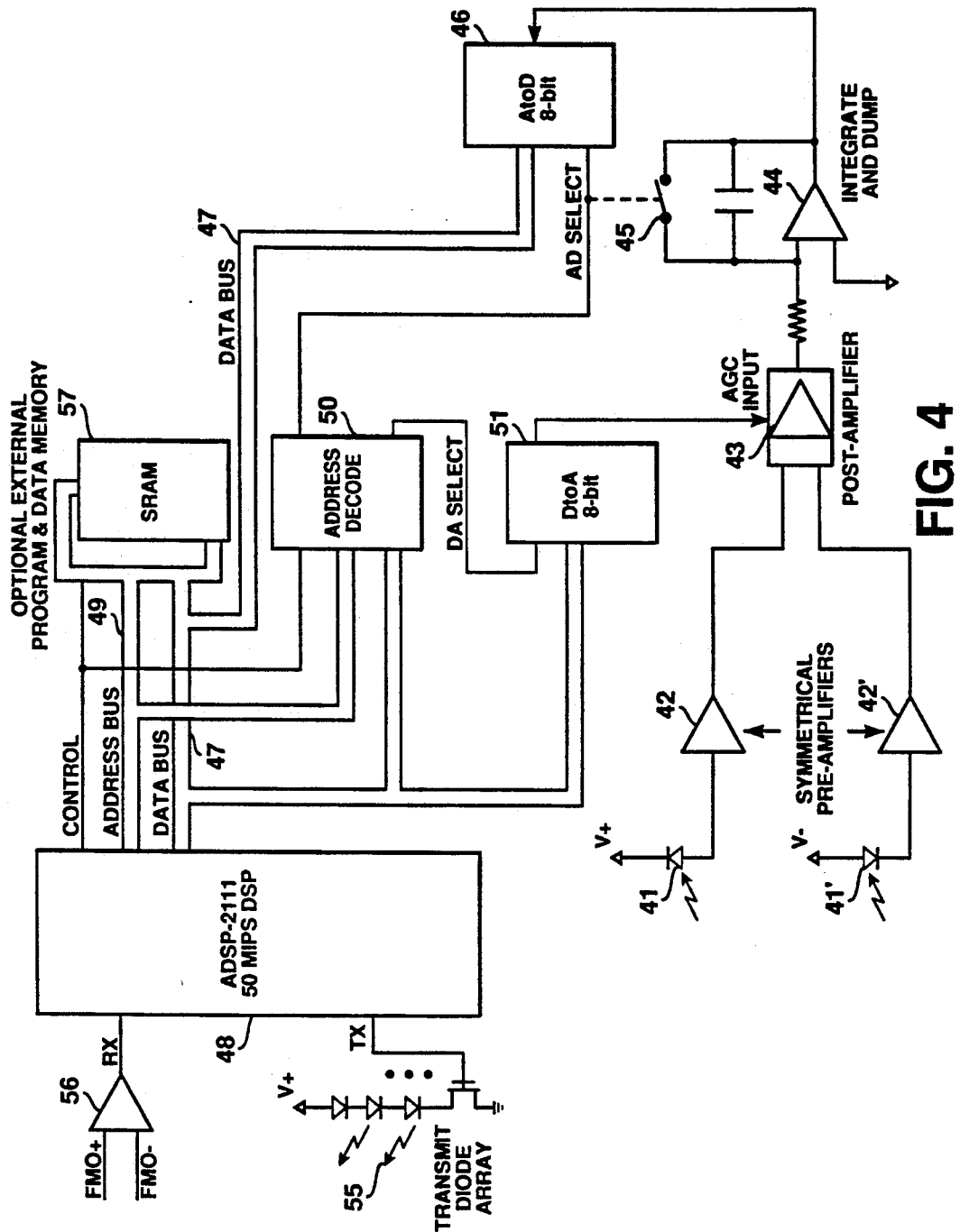
FIG. 4 shows an apparatus for receiving pulse position encoded signals in accordance with the clock synchronization of this invention.

FIG. 4 shows an apparatus for receiving pulse position encoded signals in accordance with the clock synchronization of this invention. In this apparatus, PPM signals are received as optical light pulses. On the PPM signal input path, two photoconductive diodes 41, 41' and preamplifiers 42, 42' are used to develop a differential signal input to a post-amplifier 43 which may also incorporate low pass or band pass filtering to separate the PPM signal components from general noise such as fluorescent lights. The amplified output is integrated in integrator 44 which can be reset via a dump control 45.

The output of the integrator 44 is fed to a Analog to Digital convertor 46 which provides a digital signal to the data bus 47 of a Digital Signal Processor (DSP) 48.

The DSP 48 can also address via its address bus 49 and address decode 50 to activate the dump input 45 of the Integrator 44, in order to reset the integrator for the next slot time. The DSP 48 can also activate via its address bus 49 and address decode 50 to activate a digital-to-analog converter 51. A digital value output from the DSP 48 on its data bus 47 is converted by the digital-to-analog converter 51 to a control voltage to provide Automatic Gain Control (AGC) to post-amplifier 43.

Other features connected to the DSP 48 in the apparatus of FIG. 4 are a transmit diode array 55 for generating optical pulses, a balanced serial data transmission line input 56 for receiving digital data, and a memory 57 providing data storage.

In operation, the DSP 48 controls clock signals for defining the slot positions. During a slot time, received pulse signals are integrated by integrator 44, and measured by analog-to-digital converter 46 at the end of the slot time. The measured value is returned via the data bus 47 to DSP 48. The integrator 44 is then reset for the next slot time. As the DSP 48 stores a series of measurements, it can apply various pulse recognition, noise reduction, and synchronization algorithms to the stored values to assign the slot position of received pulses, and to calculate a digital clock correction factor to more fully center the slot positions on the received pulses.

Other embodiments and variations of the invention will be apparent to one skilled in the art from a consideration of the specification drawings, and claims. It is intended that the scope of the invention be limited only by the scope of the following claims.

We claim:

1. A method for clock synchronization for receiving pulse position encoded signals, said method having a pulse signal arriving during time slots within a word time, and determining into which one time slot within said word time that a pulse signal should be placed for decoding, said method comprising:
   dividing a word time into multiple time slots according to a clock signal;
   within each time slot, integrating a pulse signal received within the time slot to arrive at a total pulse energy value for that time slot; and
   comparing the total pulse energy values for a preceding and current time slot to determine which total pulse energy value is larger, indicating the one time slot into which the pulse position encoded signal should be placed for decoding.

2. A method for clock synchronization as in claim 1 further comprising calculating the amount of time correction to apply to the clock signal to more fully center the pulse signal received into the time slot having the greater total energy value.

3. A method for clock synchronization as in claim 2 further comprising applying said time correction to said clock signal forming the time slots.

4. A method for clock synchronization as in claim 3 further comprising applying said time correction to said clock signal during a portion of time wherein such correction will not affect the decoding of received pulse signals.

5. A method for clock synchronization as in claim 1 which said dividing, integrating and comparing are done in digital form.

6. A method for clock synchronization for receiving pulse position encoded signals in a digital data receiver in which a clock signal indicates multiple slot times into which a received pulse signal may fall, comprising:
   receiving a pulse signal during a current slot time;
   integrating the received pulse signal during said current slot time to obtain an energy value E(t);
   integrating the received pulse signal during a following slot time to obtain an energy value E(t+1);
   comparing said energy values to determine the greater; and
   assigning said pulse position to the slot time of said greater energy value.

7. A method for clock synchronization as in claim 6 further comprising:
   calculating a clock signal correction factor of the percent of energy in said slot time having less energy divided by the total energy in said current and following slot times; and
   adjusting said clock signal phase by said clock signal correction factor to move said slot times a time distance of the clock signal correction factor times a full slot time in the time direction toward containing greater energy in the slot time having greater total energy, whereby to capture additional pulse signal energy from the slot time containing the lesser energy.

8. A method for clock synchronization as in claim 7 further comprising delaying said adjusting said clock signal to an interframe gap period in which adjustment will not affect receiving pulse signals containing an encoded message.

9. A method for clock synchronization as in claim 6 in which said energy values are converted to digital values and said comparing occurs digitally.

10. A method for clock synchronization for receiving pulse position encoded signals, said method having a pulse signal arriving during time slots within a frame time, and determining into which one time slot within said frame time that a pulse signal should be placed for decoding, said method comprising:

dividing a frame time into multiple time slots according to a clock signal;

within each time slot, integrating pulse signal received within the time slot to arrive at a total energy value for that time slot;

maintaining a list of total energy values for a predetermined number of time slots comprising a frame; and choosing a maximum value from said list to assign said pulse position to one slot time within said frame for decoding.

* * * * *